US012794789B2

(12) United States Patent
Sumanth et al.

(10) Patent No.: US 12,794,789 B2
(45) Date of Patent: Nov. 10, 2026

(54) MACHINE LEARNING BASED RATING FAILURE CHARACTERIZATION IN WIRELESS COMMUNICATION NETWORKS

(71) Applicant: T-MOBILE INNOVATIONS LLC, Overland Park, KS (US)

(72) Inventors: Shrustishree Sumanth, Bothell, WA (US); Bhanu Prasad, Bellevue, WA (US); Jyot Kumar, Sammamish, WA (US); Troy Angelo Duncan, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 22 days.

(21) Appl. No.: 19/170,789

(22) Filed: Apr. 4, 2025

(65) Prior Publication Data

US 2026/0312878 A1 Oct. 8, 2026

(51) Int. Cl.
*H04L 41/16* (2022.01)
*H04L 12/14* (2024.01)

(52) U.S. Cl.
CPC .......... *H04L 41/16* (2013.01); *H04L 12/1403* (2013.01)

(58) Field of Classification Search
CPC .................................................... H04L 12/1403
See application file for complete search history.

(56) References Cited

U.S. PATENT DOCUMENTS

2014/0051387 A1* 2/2014 Mollersten ............ H04M 15/00 455/406
2017/0353991 A1* 12/2017 Tapia ..................... G06Q 10/20
2018/0183939 A1* 6/2018 Wijetunge ........ H04M 15/8214
2022/0046396 A1* 2/2022 Chiaverini ............ H04M 15/65
2022/0239783 A1* 7/2022 Oliver ................... H04M 15/31
2022/0337706 A1* 10/2022 Kotecha ............ H04M 15/8016
2023/0336664 A1* 10/2023 Sundar .................. H04M 15/78
2023/0362604 A1* 11/2023 Hamid ................ H04L 12/1407
2023/0370338 A1* 11/2023 Shori .................. H04L 41/0661
2024/0396755 A1* 11/2024 Törnkvist ............ H04M 15/785
2025/0300467 A1* 9/2025 Chai ........................... H02J 7/42
2026/0067175 A1* 3/2026 Goldner .............. H04L 12/1407
2026/0142992 A1* 5/2026 Duncan ............... H04L 63/1425

OTHER PUBLICATIONS

ETSI TS 132 290 V17.6.0, 5G; Telecommunication management; Charging management; 5G system; Jan. 2023, all pages (Year: 2023).*

* cited by examiner

*Primary Examiner* — Hieu T Hoang

(57) ABSTRACT

Various embodiments include a system that comprises machine learning circuitry in a communication network. The machine learning circuitry obtains a call log from a Charging Function (CHF) in the communication network that indicates a rating failure for a data session for a user device. The machine learning circuitry generates a feature vector that numerically represents the call log. The machine learning circuitry utilizes a machine learning algorithm to process the feature vector and generate a machine learning output that indicates the cause of the rating failure. The machine learning circuitry generates an alert that identifies the cause of the rating failure and transfers the alert to a controller in the communication network. The controller interfaces with the CHF to correct the cause of the rating failure based on the alert.

20 Claims, 13 Drawing Sheets

MACHINE LEARNING BASED RATING FAILURE CHARACTERIZATION IN WIRELESS COMMUNICATION NETWORKS

TECHNICAL FIELD

Various embodiments of the present technology relate to machine learning, and more specifically, to utilizing machine learning to determine the cause of rating failures.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

Wireless communication networks determine monetary charges for users based on the users' activity on the network. The wireless network core comprises a network function, referred to as a Charging Function (CHF), that handles monetary charging. The CHF determines a monetary rate for the user's data session based on the user's subscription (e.g., purchased services) on the network, the session type a user device associated with the user is participating in, and/or other factors like device location. This process is referred to as rating. The CHF determines the monetary charge for the user based on the selected monetary rate and the amount of data consumed by the user device associated with the user. The wireless communication network delivers the monetary charge to the user via a billing system associated with the user.

Errors can occur on the CHF that prevents the CHF from selecting a monetary rate for the user's session. This is referred to as a rating failure. Exemplary errors include high processor loading, high memory occupancy, coding or other software errors, lack of input-data, and the like. In some wireless communication networks, the CHF transfers signaling to terminate the data session that it is attempting to rate in response to a rating failure. This is referred to as failing closed. In other wireless communication networks, the CHF selects a default rate and transfers signaling to allow the data session that it is attempting to rate in response to a rating failure. This is referred to as failing open.

Failing open is advantageous as it reduces service impacts on user devices caused by rating failures on the CHF. Failing open is disadvantageous as it can result in revenue losses for the wireless communication network. Determining the cause of rating failures and taking action to correct the cause of rating failures is a time consuming and labor-intensive process. Some rating failures result in more lost revenue than other rating failures. It is difficult to identify and prioritize correcting rating failures that result in more lost revenue than other rating failures that result in minimal revenue loss.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for machine learning. Some embodiments comprise a method. The method comprises obtaining, by a machine learning system in a communication network, a call log from a Charging Function (CHF) in the communication network. The call log indicates a rating failure for a data session associated with a user device. The rating failure indicates the CHF is unable to select a monetary rate to charge the user device for the data session. The method further comprises generating, by the machine learning system, a feature vector that numerically represents the call log. The method further comprises utilizing, by the machine learning system, a machine learning algorithm trained to determine causes of rating failures by the CHF to process the feature vector and generate a machine learning output that indicates the cause of the rating failure for the data session associated with the user device. The method further comprises generating, by the machine learning system, an alert that identifies the cause of the rating failure based on the machine learning output. The method further comprises transferring, by the machine learning system, the alert to a controller in the communication network. The controller interfaces with the CHF to correct the cause of the rating failure for the data session associated with the user device.

Some embodiments comprise a system. The system comprises machine learning circuitry in a communication network. The machine learning circuitry obtains a call log from a CHF in the communication network. The call log indicates a rating failure for a data session associated with a user device. The rating failure indicates the CHF is unable to select a monetary rate to charge the user device for the data session. The machine learning circuitry generates a feature vector that numerically represents the call log. The machine learning circuitry utilizes a machine learning algorithm trained to determine causes of rating failures by the CHF to process the feature vector and generate a machine learning output that indicates the cause of the rating failure for the data session associated with the user device. The machine learning circuitry generates an alert that identifies the cause of the rating failure based on the machine learning output. The machine learning circuitry transfers the alert to a controller in the communication network. The controller interfaces with the CHF to correct the cause of the rating failure for the data session associated with the user device based on the alert.

Some embodiments comprise one or more non-transitory computer readable storage media having program instructions stored thereon. When executed by a computing system, the program instructions direct the computing system to perform operations. The operations comprise obtaining a call log from a CHF in a communication network. The call log indicates a rating failure for a data session associated with a user device and the rating failure indicates the CHF is unable to select a monetary rate to charge the user device for the data session. The operations further comprise generating a feature vector that numerically represents the call log. The operations further comprise utilizing a machine learning algorithm trained to determine causes of rating failures by the CHF to process the feature vector and generate a machine learning output that indicates the cause of the rating failure for the data session associated with the user device. The operations further comprise generating an alert that identifies the cause of the rating failure based on the machine learning output. The operations further comprise transferring the alert to a controller in the communication network.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
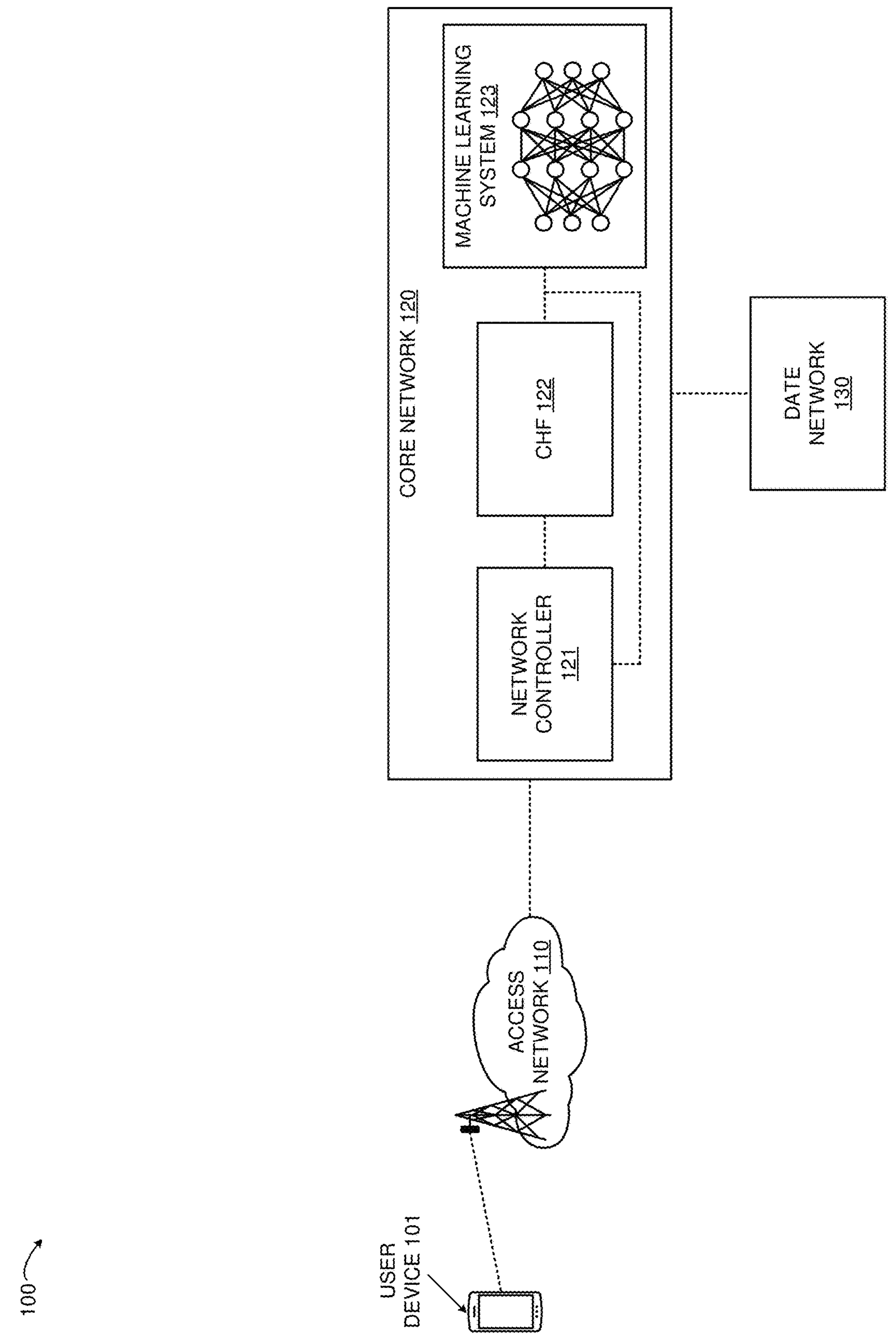
FIG. 1 illustrates an example of a communication network that utilizes machine learning to determine the cause of rating failures.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

Charging Function (CHF) is a Fifth Generation Core (5GC) network function that tracks data usage by user devices, selects monetary rates for data sessions by user devices, and generates monetary charges for the users of the user devices based on the selected monetary rates and the amount of data used by the wireless user device. The process of selecting a monetary rate is referred to as rating. The CHF rates a data session for a user device based on factors like the session type, data type, the user device's subscription (e.g., purchased services) on the network, the user device's network location (i.e., roaming status), and the like. The CHF multiplies the amount of data consumed by the user device by the selected rate to determine a monetary charge for the user of the user device. The communication network delivers the monetary charge to the user via a billing system associated with the user. Various errors can occur in the communication network that prevents the CHF from selecting a rate for the data session. This is referred to as a rating failure.

In some communication networks, the CHF selects a default rate for the data session in response to the rating failure and transfers signaling to allow the data session. This is referred to as failing open. When a rating failure occurs and the CHF elects to fail open, the CHF generates a call log that indicates the rating failure. The call log is delivered to human network operators who then work to resolve the cause of the rating failure. While failing open in response to rating failures minimize service impacts towards user devices, failing open can result in lost revenue by the communication networks. Wireless communication networks serve large numbers (e.g., millions) of user devices which engage in a large number of data sessions on the networks. As such, the number of rating failures that occur on a given wireless communication network can be correspondingly large (tens of thousands). It is difficult and time consuming to manually identify the cause of and correct rating failures. This difficulty is compounded by the large number of rating failures. Unfortunately, wireless communication networks do not effectively and efficiently determine the cause of and respond to rating failures on the CHF.

To overcome the above-described problems in conventional wireless communication networks, various embodiments of the present technology relate to utilizing machine learning to determine the cause of rating failures. When a rating failure occurs for a data session, the CHF generates a call log that indicates the rating failure and that includes data characterizing the data session, the user device's subscription on the network, and the user device's location. A machine learning system obtains the call log and generates a feature vector(s) that numerically represents the data included in the call log. The machine learning system provides the feature vector to a machine learning algorithm trained to determine the cause of rating failures on the CHF. The machine learning algorithm processes the feature vector and produces a machine learning output that indicates the cause of the rating failure and potentially other information like an estimated severity of the rating failure (e.g., with respect to lost revenue). The machine learning system generates and transfers an alert that indicates the predicted cause of the rating failure to a controller in the communication network. The controller takes corrective action to resolve the rating failure on the CHF based on the alert. Utilizing machine learning to detect and respond to rating failures reduces the time, effort, and cost compared to manually resolving rating failures on the CHF. These reductions in time, effort, and cost improve the overall operation of the wireless communication network. Now referring to the Figures.

FIG. 1 illustrates communication network 100 to utilize machine learning to determine the cause of rating failures. Communication network 100 provides services like media-streaming, media-broadcasting, internet-access, voice/video calling, text messaging, online gaming, social media, machine communications, remote device control, and/or some other wireless communications product. Communication network 100 comprises user device 101, access network 110, core network 120, and data network 130. Core network 120 comprises network controller 121, CHF 122, and machine learning system 123. In other examples, communication network 100 may comprise additional or different elements than those illustrated in FIG. 1.

Various examples of network operation and configuration are described herein. In some examples, user device 101 attaches to access network 110 and requests wireless data services from network controller 121. Network controller 121 authorizes user device 101 for wireless service and transfers a request to CHF 122 to rate (e.g., determine a monetary charge) the session. During normal operation, CHF 122 accesses a subscriber profile for user device 101 and determines if user device 101 is eligible for data service. If eligible, CHF 122 selects a rate (e.g., a cost per data unit) for the data session and notifies network controller 121 that user device 101's session may proceed. As user device 101 participates in its data session, CHF 122 tracks the amount of data consumed by user device 101 and generates a monetary charge for user device 101 based on the amount of data exchanged and the data rate selected for the data session. CHF 122 modifies the subscriber profile to indicate the monetary charge. Anomalies may occur on CHF 122 that inhibit CHF 122 from selecting a rate for the session which is referred to as a rating failure. When a rating failure occurs, CHF 122 may elect to allow the data session for user device 101 to continue on communication network 100 using a default rate. This process is referred to as failing open. Communication network 100 utilizes failing open to minimize service disruption to user device 101. Rating failures may have a number of different causes. For example, CHF 122 may determine to fail open when CHF 122 receives insufficient input data and cannot identify the correct rate for the data session.

When CHF 122 is unable to rate the data session for user device 101 and elects to enable fail-open, CHF 122 generates a call log that characterizes the rating failure and transfers the call log to machine learning system 123. The call log may include information like the data type and session type for the session, the service types available to user device 101, the service type selected to rate user device 101's data session, location data associated with user device 101, and the like. Machine learning system 123 hosts a machine learning algorithm trained to determine the cause of the rating failure by CHF 122. Machine learning system 123 generates a feature vector that numerically represents the call log. A feature vector is an n-dimensional string of numbers that represents information in a format interpretable by a machine learning algorithm. Machine learning system 123 utilizes the machine learning algorithm to process the feature vector and generate a machine learning output that indicates the cause of the rating failure. Machine learning system 123 generates and transfers an alert to network controller 121 that characterizes the cause of the rating failure. For example, the alert may indicate the severity of the rating failure, a corrective action(s) to fix the cause of the rating failure, and the like. Network controller 121 receives the alert and in response, interfaces with CHF 122 to correct the cause of the rating failure.

Advantageously, communication network 100 effectively utilizes machine learning to determine the cause of rating failures by CHF 122. Moreover, communication network 100 efficiently corrects the cause of rating failures based on the machine learning output.

User device 101 may comprise a phone, computer, vehicle, drone, robot, sensor, or another type of data appliances with wireless and/or wireline communication circuitry. User device 101 and access network 110 may communicate over links using wireless/wireline technologies like Sixth Generation Radio (6GR), Fifth Generation New Radio (5GNR), Long Term Evolution (LTE), Institute of Electrical and Electronic Engineers (IEEE) 802.11 (WiFi), IEEE 802.3 (Ethernet), Low-Power Wide Area Network (LP-WAN), Bluetooth, and/or some other type of wireless and/or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface.

Access network 110 may comprise a tower (e.g., to mount a radio at elevation), another type of mounting structure (e.g., a building), or no mounting structure at all. Access network 110 may comprise a Sixth Generation (6G) Radio Access Network (RAN) node, Fifth Generation (5G) RAN node, LTE RAN node, gNodeB, eNodeB, Narrow Band Internet-of-Things (NB-IoT) access node, trusted non-Third Generation Partnership Project (3GPP) access node, untrusted non-3GPP access node, Low Power-Wide Area Network (LP-WAN) base station, wireless relay, WiFi hotspot, Bluetooth access node, Ethernet access node, and/or another type of wireless or wireline network transceiver. Although access network 110 is illustrated as comprising a terrestrial access network, in some examples access network 110 may comprise a non-terrestrial (e.g., satellite based) access network. Access network 110 exchanges network signaling and user data with network functions clustered together into core network 120. Access network 110 is connected to core network 120 over one or more backhaul data links. Access network 110 and core network 120 may communicate via edge networks like internet backbone providers, edge computing systems, or another type of edge system to provide the backhaul data and signaling links between access network 110 and core network 120.

Access network 110 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 120. The CUS handle higher wireless network layers like the Radio Resource Control (RRC), Service Data Adaption Protocol (SDAP), and Packet Data Convergence Protocol (PDCP). The CUs are coupled to network functions in core network 120. Alternatively, access network 110 may comprise RUs and Baseband Units (BBUs). The BBUs are usually nearby network computers and handle network layers like RRC, SDAP, PDCP, RLC, MAC, and PHY. The BBUs are coupled to network functions in core network 120.

Core network 120 is representative of a computing system that provides wireless data services to user device 101 over access network 110. Exemplary computing systems comprise Network Function Virtualization Infrastructure (NFVI) systems, data centers, server farms, cloud computing networks, hybrid cloud networks, and the like. Core network 120 may comprise a 3GPP core network architecture like Sixth Generation Core (6GC), Fifth Generation Core (5GC), Evolved Packet Core (EPC), and/or another type of 3GPP core network architecture. Access network 110, core network 120, and data network 130 communicate over various links that use metallic links, glass fibers, radio channels, or some other communication media. The links use 6GC, 5GC, EPC, Ethernet, Time Division Multiplex (TDM), Data Over Cable System Interface Specification (DOCSIS), Internet Protocol (IP), General Packet Radio Service Transfer Protocol (GTP), 6GR, 5GNR, LTE, WiFi, virtual switching, inter-processor communication, bus interfaces, and/or some other data communication protocol. The computing systems of core network 120 store and execute the network functions to form network controller 121, CHF 122, and machine learning system 123. The network functions are typically organized into a control plane and a user plane. Exemplary control plane network functions include Access and Mobility Management Function (AMF), Session Management Function (SMF), Policy Control Function (PCF), Unified Data Management (UDM), Unified Data Registry (UDR), CHF, Mobility Management Entity (MME), Policy and Rules Charging Function (PCRF), Home Subscriber Server (HSS), and the like. Exemplary user plane network functions include User Plane Function (UPF), Serving Gateway (SGW), Packet Gateway (PGW), and the like.

Machine learning system 123 comprises one or more machine learning models. The one or more machine learning models comprise any machine learning model or artificial intelligence system implemented within communication network 100 trained to trained to detect the cause of rating failures, the severity of rating failures, predict rating failure rates, recommend actions to resolve rating failures, and/or perform some other machine learning operation. A machine learning model comprises one or more artificial intelligence/machine learning algorithms that are trained based on historical data and/or other types of training data associated with wireless communication networks. A machine learning model may employ one or more machine learning algorithms through which data can be analyzed to identify patterns, make decisions, make predictions, or similarly produce output. Examples of machine learning models that may be employed solely or in conjunction with one another include time-series models, autoregressive models, Holt-winters models, Reimann-Theta Boltzmann models, decomposable time series models, and Neural Prophet models. Other exemplary machine learning models include Large Language Models (LLMs), Three Dimensional (3D) deep leaning models, 3D convolutional neural networks, times series convolutional deep learning, transformers, multi-layer perceptron, long term short memory, and attention based deep learning model, artificial neural networks, nearest neighbor methods, ensemble random forests, support vector machines, naïve Bayes methods, linear regressions, or similar machine learning techniques or combinations thereof capable of predicting output based on input data.

Data network 130 comprises application servers, gateways, routers, Content Distribution Networks (CNDs) and/or other communication devices to participate in data sessions with user device 101. For example, data network 130 may comprise an application server that hosts the server-side component of a user application executing on user device 101. Data network 130 may be representative of a public data network (e.g., the Internet) or a private data network (e.g., an enterprise network). Core network 120 and data network 130 may communicate via links provided by internet backbone providers, edge computing services, and/or other communication services that provide the data links between core network 120 and data network 130.

User device 101 and access network 110 comprise antennas, amplifiers, filters, modulation, analog/digital interfaces, microprocessors, software, memories, transceivers, bus circuitry, and the like. User device 101, access network 110, core network 120, and data network 130 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), Analog Processing Units (APUs), and/or the like. The memories comprise Random Access Memory (RAM), Solid State Drives (SSDs), Hard Disk Drives (HDDs), Non-Volatile Memory Express (NVMe) SSDs, and/or the like. The memories store software like operating systems, user applications, radio applications, and network functions. The microprocessors retrieve the software from the memories and execute the software to drive the operation of communication network 100 as described herein.

Figure 2:
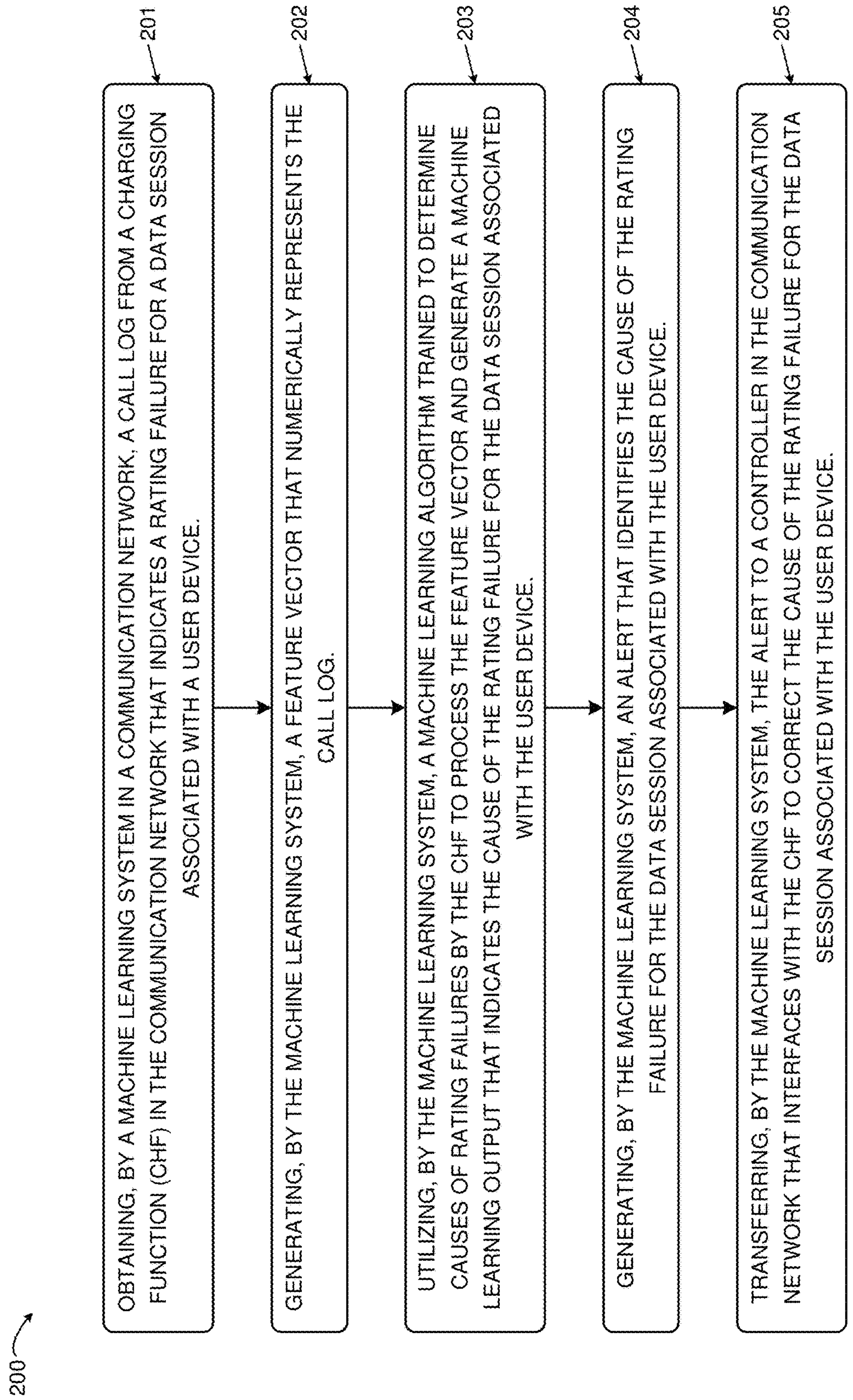
FIG. 2 illustrates a first exemplary operation of the communication network to utilize machine learning to determine the cause of rating failures.

FIG. 2 illustrates process 200. Process 200 comprises an exemplary operation of communication network 100 to utilize machine learning to determine the cause of rating failures. Process 200 may vary in other examples. The operations of process 200 comprise obtaining, by a machine learning system in a communication network, a call log from a CHF in the communication network that indicates a rating failure for a data session associated with a user device (step 201). The rating failure indicates the CHF is unable to select a monetary rate for the data session. The operations further comprise generating, by the machine learning system, a feature vector that numerically represents the call log (step 202). The operations further comprise utilizing, by the machine learning system, a machine learning algorithm trained to determine the causes of rating failures by the CHF to process the feature vector and generate a machine learning output that indicates the cause of the rating failure for the data session associated with the user device (step 203). The operations further comprise generating, by the machine learning system, an alert that identifies the cause of the rating failure for the data session associated with the user device (step 204). The operations further comprise transferring, by the machine learning system, the alert to a controller in the communication network that interfaces with the CHF to correct the cause of the rating failure for the data session associated with the user device (step 205).

Figure 3:
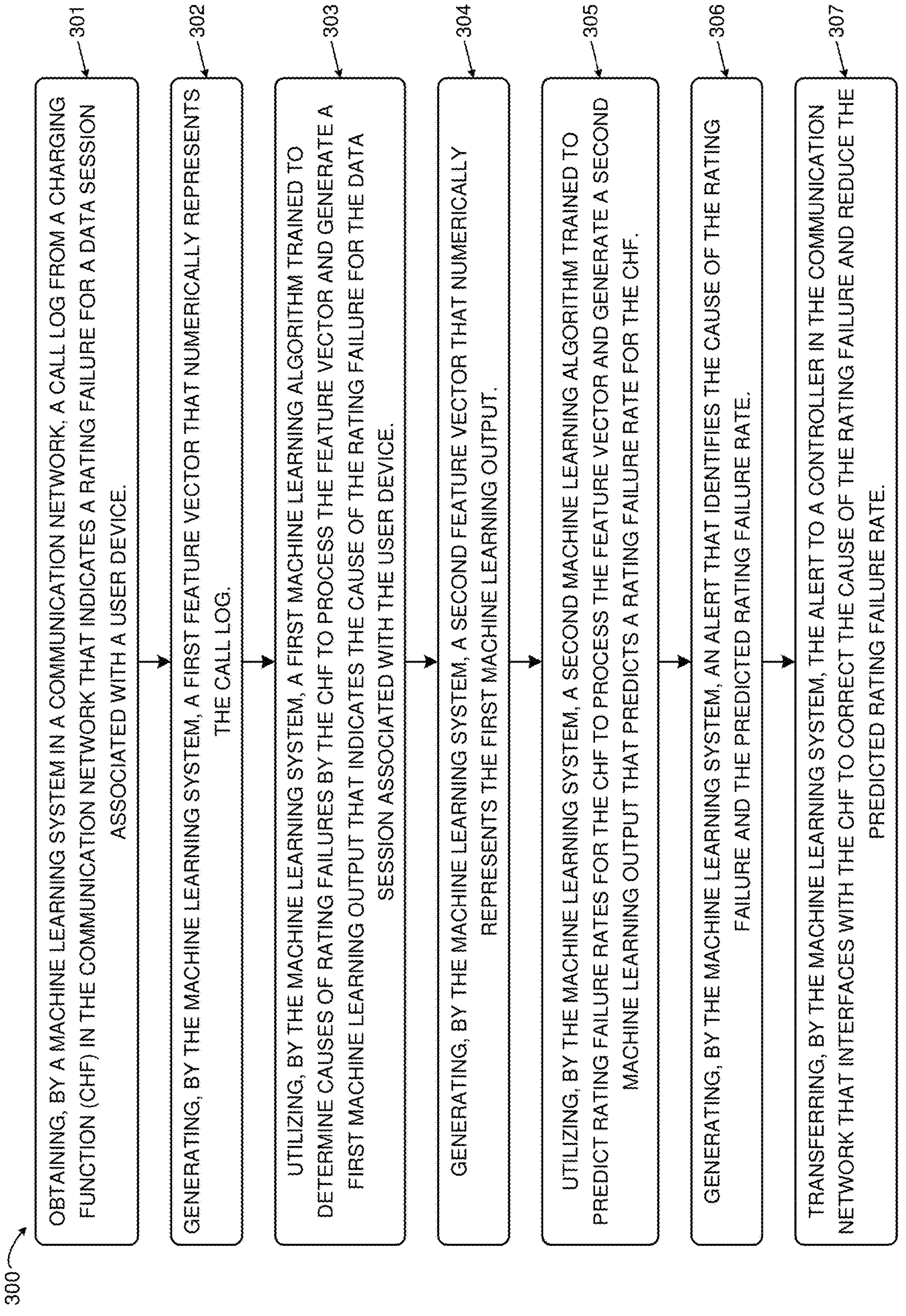
FIG. 3 illustrates a second exemplary operation of the communication network to utilize machine learning to determine the cause of rating failures.

FIG. 3 illustrates process 300. Process 300 comprises an exemplary operation of communication network 100 to utilize machine learning to determine the cause of rating failures. Process 300 comprises an example of process 200 illustrated in FIG. 2, however process 200 may differ. Process 300 may vary in other examples. The operations of process 300 comprise obtaining, by a machine learning system in a communication network, a call log from a CHF in the communication network that indicates a rating failure for a data session associated with a user device (step 301). The operations further comprise generating, by the machine learning system, a first feature vector that numerically represents the call log (step 302). The operations further comprise utilizing, by the machine learning system, a first machine learning algorithm trained to determine the causes of rating failures by the CHF to process the first feature vector and generate a first machine learning output that indicates the cause of the rating failure for the data session associated with the user device (step 303). The operations further comprise generating, by the machine learning system, a second feature vector that numerically represents the first machine learning output (step 304). The operations further comprise utilizing, by the machine learning system, a second machine learning algorithm trained to predict rating failure rates for the CHF to process the second feature vector and generate a second machine learning output that predicts a rating failure rate for the CHF (step 305). The operations further comprise generating, by the machine learning system, an alert that identifies the cause of the rating failure and the predicted rating failure rate (step 306). The operations further comprise transferring, by the machine learning system, the alert to a controller in the communication network that interfaces with the CHF to correct the cause of the rating failure and reduce the predict rating failure rate (step 307).

Figure 4:
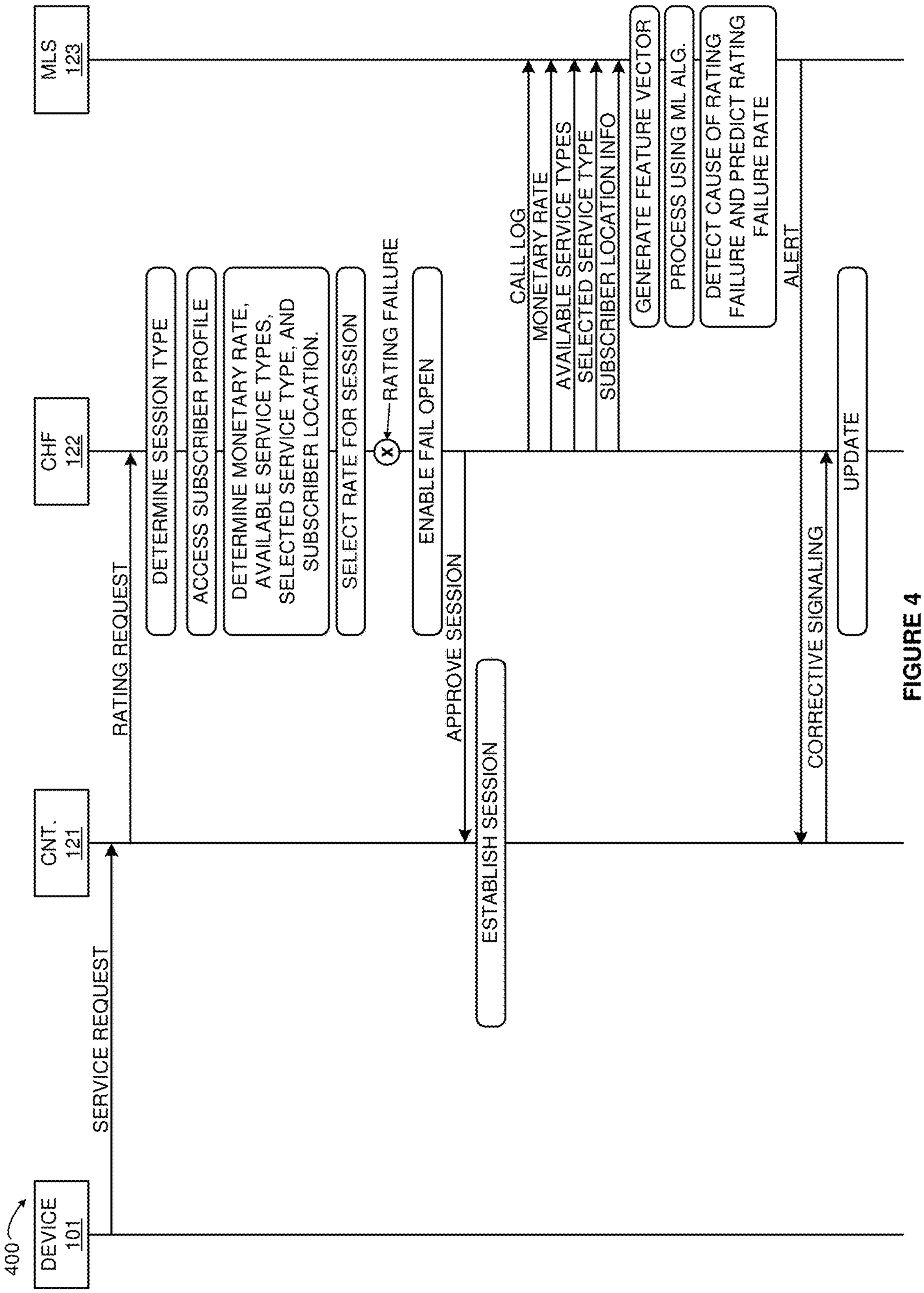
FIG. 4 illustrates a third exemplary operation of the communication network to utilize machine learning to determine the cause of rating failures.

FIG. 4 illustrates process 400. Process 400 comprises an exemplary operation of communication network 100 to utilize machine learning to determine the cause of rating failures. Process 400 comprises an example of process 200 illustrated in FIG. 2 and process 300 illustrated in FIG. 3, however processes 200 and 300 may differ. Process 400 may vary in other examples. In some examples, user device 101 attaches to access network 110 and transfers a registration request to network controller (CNT.) 121. The registration request includes information like subscriber Identifier (ID), device capabilities, Protocol Data Unit (PDU) session requests, slice requests, and the like. Network controller 121 authenticates user device 101 and authorizes user device 101 for service on communication network 100. Responsive to authentication and authorization, network controller 121 registers user device 101 for service on communication network 100. Network controller 121 transfers a registration (REG) accept message to user device 101. The registration accept message includes information like device context, network addresses, slice IDs, and/or other information for user device 101 to begin its data session.

User device 101 transfers a session request to network controller 121 for a data session on communication network 100 based on the registration accept message. Network controller 121 receives the request and in response, transfers a rating request to CHF 122. CHF 122 determines information characterizing the session like data type, session type (e.g., voice call, data session, priority service, etc.), and the like based on the request. CHF 122 interfaces with a network data system that stores a subscriber profile for user device 101 to retrieve service attributes that define user device 101's subscription on communication network 100. CHF 122 accesses the subscriber profile and determines the service types available to user device 101, selects one of the available service types for monetary rating, and determines subscriber location information. CHF 122 attempts to select a monetary rate for user device 101's data session but an error occurs preventing CHF 122 from selecting a monetary rate, which is a rating failure. CHF 122 enables fail open for user device 101's data session, selects a default monetary rate for the session, and transfers a session approval message to network controller 121. Network controller 121 establishes the data session for user device 101 based on the session approval message. Network controller 121 reports data usage to CHF 122. CHF 122 determines a monetary charge by multiplying the default rate and the amount of data reported by network controller 121.

When the rating failure occurs, CHF 122 transfers a call log to machine learning system (MLS) 123 to indicate the rating failure. The call log includes the information characterizing the session, user device 101's available service types, the selected service type for rating user device 101's session, and the subscriber location information for user device 101. Machine learning system 123 generates a feature vector to numerically represent the information included in the call log and provides the feature vector to its machine learning algorithm trained to detect the cause of rating failures on CHF 122. The machine learning algorithm processes the feature vector and generates a machine learning output that indicates that the cause of the rating failure. For example, the machine learning algorithm may detect that rating failure resulted from a lack of computing resources for CHF 122, signaling errors between network controller 121 and CHF 122, unknown request parameters included in the rating request, software errors on CHF 122, and/or other types of errors that result in rating failure. Machine learning system 123 generates and transfers an alert to network controller 121 based on the machine learning output. Network controller 121 terminates user device 101's data session in response to the alert.

Figure 5:
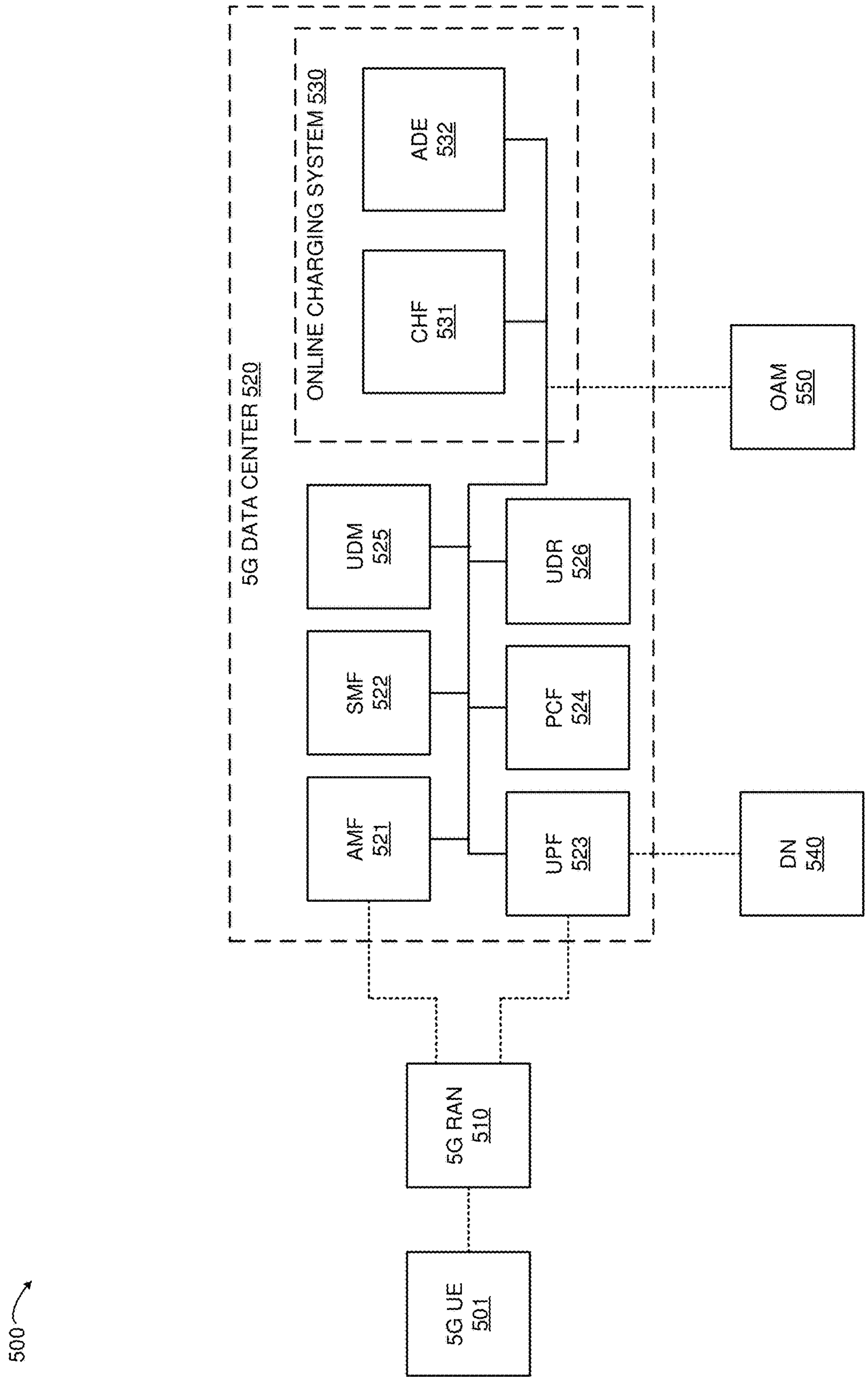
FIG. 5 illustrates an example of a Fifth Generation (5G) communication network that utilizes machine learning to detect illegitimate fail-open conditions.

FIG. 5 illustrates 5G communication network 500 to utilize machine learning to determine the cause of rating failures. 5G communication network 500 comprises an example of communication network 100 illustrated in FIG. 1, however communication network 100 may differ. 5G communication network 500 comprises 5G UE 501, 5G RAN 510, 5G data center 520, data network 540, and Orchestration and Management (OAM) 550. 5G data center 520 comprises AMF 521, SMF 522, UPF 523, PCF 524, UDM 525, UDR 426, and online charging system 530. Online charging system 530 comprises CHF 531 and Anomaly Detection Engine 533. Other network functions and network entities like Authentication Server Function (AUSF), Network Repository Function (NRF), Network Slice Selection Function (NSSF), Home Subscriber Server (HSS), Home Subscriber Register (HLR), Short Message Service Function (SMSF), Network Exposure Function (NEF), Application Function (AF), Equipment Identity Register (EIR), and Session Communication Proxy (SCP) are typically present in 5G data center 520 but are omitted for clarity. In other examples, 5G communication network 500 may comprise different or additional elements than those illustrated in FIG. 5.

In some examples, 5G UE 501 attaches to 5G RAN 510. UE 501 transfers a registration request to AMF 521 over 5G RAN 510. The registration request indicates information like a registration type, NSSAI requests, 5G-Global Unique Temporary Identifier (GUTI), Tracking Area Identifier (TAI), UE capabilities, PDU session requests, and the like. In response to the registration request, AMF 521 transfers a Non-Access Stratum (NAS) identity request to UE 501 over 5G RAN 510 and the radio signaling bearer. UE 501 indicates its Subscriber Concealed Identifier (SUCI) to AMF 521 over 5G RAN 510. AMF 521 interfaces with other network functions like UDM 525 to derive the Subscriber Permanent Identifier (SUPI) of UE 501 and to authenticate the identity of UE 501. Typically, authentication involves presenting a random number challenge to UE 501 and matching an authentication response from UE 501 with an expected result to verify the identity of UE 501.

Responsive to the authentication, AMF 521 interfaces with UDM 525 to generate context for UE 501. The UE context defines the authorized services for UE 501. To form the context, AMF 521 retrieves access and mobility subscription data, SMF selection subscription data, and UE context in SMF data from UDM 525. The access and mobility subscription data comprises a supported feature list for UE 501 (e.g., Quality of Service Class Indicator (QCI), Aggregate Maximum Bit Rate (AMBR), latency, voice/video calling, internet access, etc.), a General Public Subscription Identifier (GPSI) array, slice selection information, and the like. The SMF selection data comprises a supported feature list, and a list of allowed S-NSSAIs and associated information. The UE context in SMF data comprises PDU session and EPC interworking information. AMF 521 forms the UE context for UE 501 using the retrieved information. AMF 521 interfaces with PCF 524 to retrieve policy association information for UE 501. The policy association information comprises the SUPI, GPSI, PEI, and user location information for UE 501.

AMF 521 selects SMF 522 to serve UE 501 based on SMF selection data, the policy association information, and/or the network slice(s) of UE 501. AMF 521 transfers a list of requested PDU sessions (as received during the registration request), a PDU session activation command, the SUPI, and typically other information associated with UE 501 to SMF 522. SMF 522 receives the PDU session list, session activation command, and the SUPI from AMF 521. SMF 522 determines the number of data units to support the session. SMF 522 transfers a charging data request to CHF 531 in online charging system 530. The request indicates the number of data units for the session as well as various metrics characterizing the session. For example, the request may indicate the data type (voice data, text messaging, user data, etc.) and the PDU session type (internet access, streaming, etc.). This additional information is referred to as the rating group.

CHF 531 receives the charging data request from SMF 522. In response, CHF 531 accesses a subscriber profile for UE 501 stored on UDR 526 to determine if UE 501 is allowed to receive service. For example, CHF 531 may check an account balance for UE 501 to determine if UE 501 is allowed to receive service. When authorized, CHF 531 determines the allowed service types provisioned to UE 501 in the subscriber profile. The allowed service types are referred to as offers. For example, UE 501 may be provisioned offers for domestic data service, domestic roaming, and international roaming. CHF 531 selects one of the offers based on the rating group received from SMF 522. CHF 531 calculates the amount of data allowed for the PDU session based on factors like UE 501's data quota, the location of UE 501, and the rating group. CHF 531 attempts to rate the PDU session based on the rating group, the selected offer, the location of UE 501, and the like however, an error occurs inhibiting CHF 531 from rating the PDU session. Exemplary error types include unknown rating group, insufficient input information, request time out, excessive CPU loading, excessive memory occupancy, coding errors, and the like. In response, CHF 531 decides to fail open the PDU session to minimize service impact towards UE 501 caused by the rating failure. CHF 531 selects a default rate for the PDU session based on the rating failure and transfers a response to SMF 522 approving the PDU session.

In response to the approval, SMF 522 allocates an IP address to UE 501 for the requested PDU session and allocates a Tunnel Endpoint Identifier (TEID) for the session. SMF 522 selects UPF 523 to serve UE 501. SMF 522 transfers a session modification request that includes a session endpoint identifier and TEID to UPF 523 to set up the PDU session for UE 501. The selected one(s) of UPF 523 sets up a default bearer for UE 501 with 5G RAN 510. The default bearer is a link to carry IP packets for UE 501's PDU session. The selected one(s) of UPF 523 transfers a session modification response to SMF 522 that includes the session endpoint identifier to confirm bearer setup. SMF 522 returns a PDU session create response to AMF 521 to confirm session creation. The response includes the updated session context (e.g., allocated IP addresses, TEID, P-CSCF address, etc.). In response, AMF 521 registers UE 501 for service on 5G data center 520. AMF 521 generates a registration accept message that includes the allocated UE IP address, RAN ID, AMBR, Globally Unique AMF ID (GUAMI), PDU session ID, PDU session TEID, allowed NSSAI list, security data, and the like. AMF 521 transfers the registration accept message to 5G RAN 510 to direct 5G RAN 510 to serve UE 501.

5G RAN 510 transfers an RRC reconfiguration message to UE 501 to set up data radio bearers. The message includes cell IDs, bearer configuration information, network address, and the like. UE 501 configures its radio bearers using the received information. In response, UE 501 begins its PDU session on 5G communication network 500. 5G RAN 510 wirelessly exchanges user data for the PDU session with UE 501. 5G RAN 510 exchanges the user data with one UPF 523. UPF 523 exchanges the user data with data network 540. SMF 522 tracks the amount of data consumed during the session and reports the amount to CHF 531. CHF 531 calculates a charge for the PDU session based on the amount of consumed data and the default rate selected in response to the charging failure.

CHF 531 generates a call log in response to the rating failure for the PDU session. The call log identifies the subscriber (e.g., UE 501), the PDU session, the rating group for the PDU session, the offers provisioned to UE 501's subscriber profile, the offer selected for the PDU session, and location information (e.g., non-roaming, roaming, etc.) for UE 501. CHF 531 transfers the call log to ADE 532. ADE 532 comprises a set of machine learning algorithms trained to detect the cause of rating failures, predict the future rating failure rate, determine the severity of the rating failure, and generate recommendations to respond to detected rating failures and predicted rating failure rates. ADE 532 generates feature vectors that numerically represent the call log, the average response time to correct rating failures, and the average rating failure rate for CHF 531. ADE 532 processes the feature vectors using its machine learning algorithms to determine the cause of the rating failure for UE 501's PDU session, determine the severity of the rating failure, predict the future rating failure rate for CHF 531, and generate a recommendation to respond to the rating failure on CHF 531. The recommended response may depend on the severity of the rating failure. For example, ADE 532 may prioritize responding to severe rating failures (e.g., rating failures with large revenue impacts) over less server rating failures (e.g., rating failures with minimal revenue impacts). ADE 532 transfers the recommendation as an alert to OAM 550.

OAM 550 is representative of a network management system that controls network function instantiation, network function deactivation, network function software updating, and/or other types of network operation. OAM 550 receives the alert sent by ADE 532. OAM 550 responds to the rating failure on CHF 531 based on the recommendation generated by ADE 532. For example, ADE 532 may determine the rating failure was caused by a server time-out on CHF 531 and may determine the rating failure has a large revenue impact. ADE 532 may then generate recommendation that includes a software update to correct the server time-out error and that marks the rating failure as severe. In response, OAM 550 may prioritize correcting this rating failure and load the update to CHF 531 to correct the cause of the rating failure and reduce the future rating failure rate.

Figure 6:
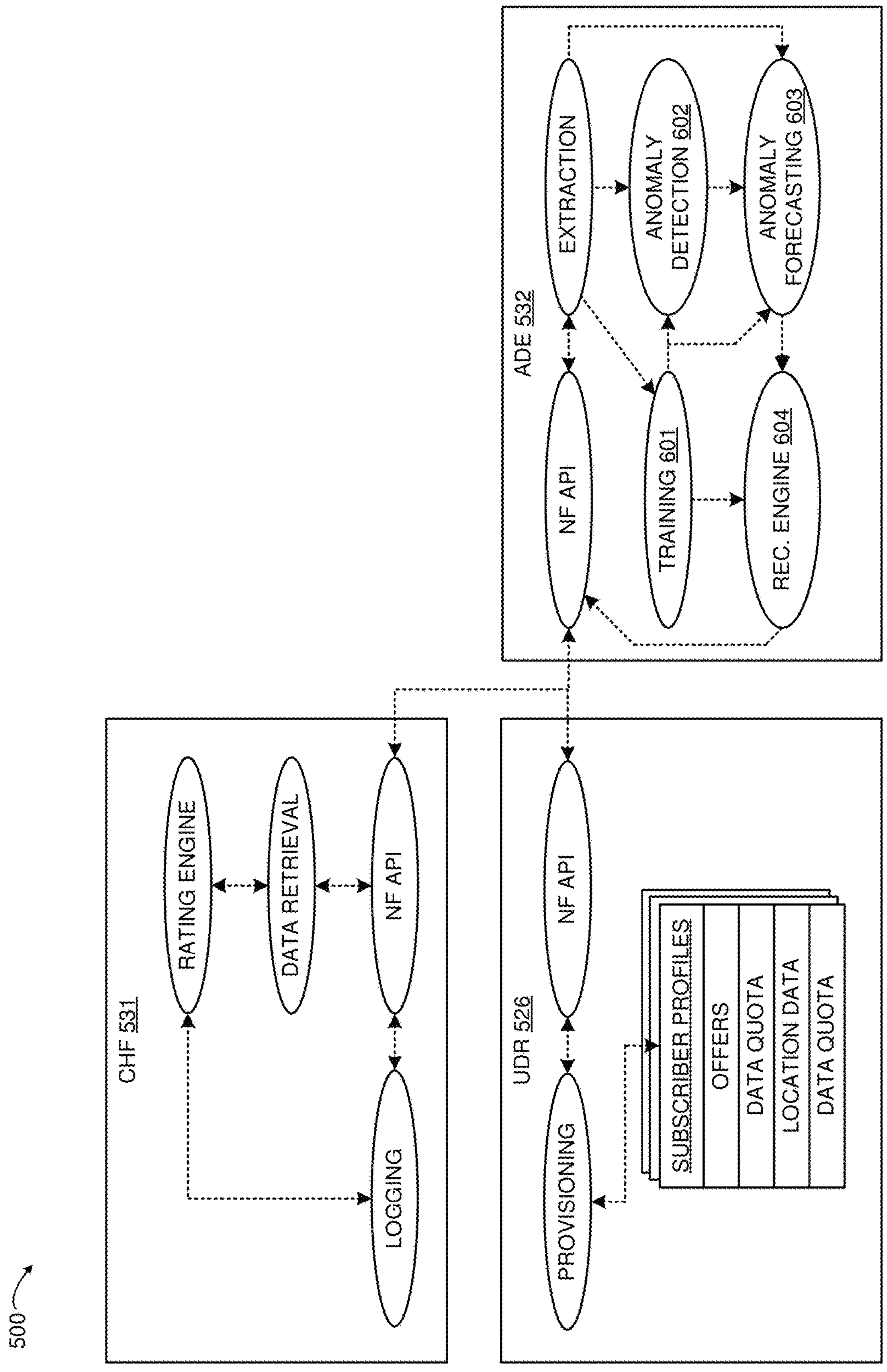
FIG. 6 illustrates network functions in the 5G communication network that utilizes machine learning to determine the cause of rating failures.

FIG. 6 illustrates UDR 526, CHF 531, and ADE 532 in 5G communication network 500. In some examples, UDR 526 comprises modules for network function Application Programming Interface (API) and provisioning and stores subscriber profiles. The provisioning module writes updates to the subscriber profiles. The subscriber profiles comprise a set of service attributes that define a given UE's subscription to 5G communication network 500. In this example, the subscriber profiles store attributes for provisioned offers, a data quota, and location information for UEs on 5G communication network 500. CHF 531 comprises modules for network function API, data retrieval, logging, and a rating engine. In some examples, the rating engine comprises a subcomponent of a Service Data Point (SDP) in CHF 531. The data retrieval module accesses subscriber profiles and retrieves the relevant information in response to receiving a rating request from SMF 522 for a PDU session. The rating engine selects monetary rates for the PDU session based on the retrieved information and the information received in the request, decides to fail open in response to rating failures, and generates monetary charges based on the selected rates and consumed data. The logging module generates call logs that indicate fail open conditions. The call logs identify the PDU session, identify the UE, indicate the rating failure, and include the selected offer, the provisioned offers, the rating group, and UE location information.

ADE 532 comprises modules for NF API, feature extraction, and training module 601, and implements anomaly detection model 602, anomaly forecasting model 603, and recommendation (REC.) engine 604. The feature extraction module converts fail open call logs received from CHF 531 and outputs produced by models 602 and 603 into feature vectors that numerically represent the data included in the call logs and machine learning outputs. Training module 601 generates training data sets based on historical call logs, historical machine learning outputs, and the like to train models 602-604. Anomaly detection model 602 comprises algorithms trained to determine the cause and severity of rating failures based on the PDU session rating group, the provisioned offers, the selected offer, and subscriber location information. Anomaly forecasting model 603 comprises algorithms trained to predict the future rate of rating failures by CHF 531 based on the output from anomaly detection model 602, the average response time to resolve rating failures, and the average rating failure rate. Recommendation engine 604 comprises algorithms trained to recommend responses to detected ratings failures and predicted rating failure rates based on the outputs from models 602 and 603. The network function APIs allow UDR 526, CHF 531, and ADE 532 to communicate with each other and with other network functions in and entities in 5G communication network 500.

Figure 7:
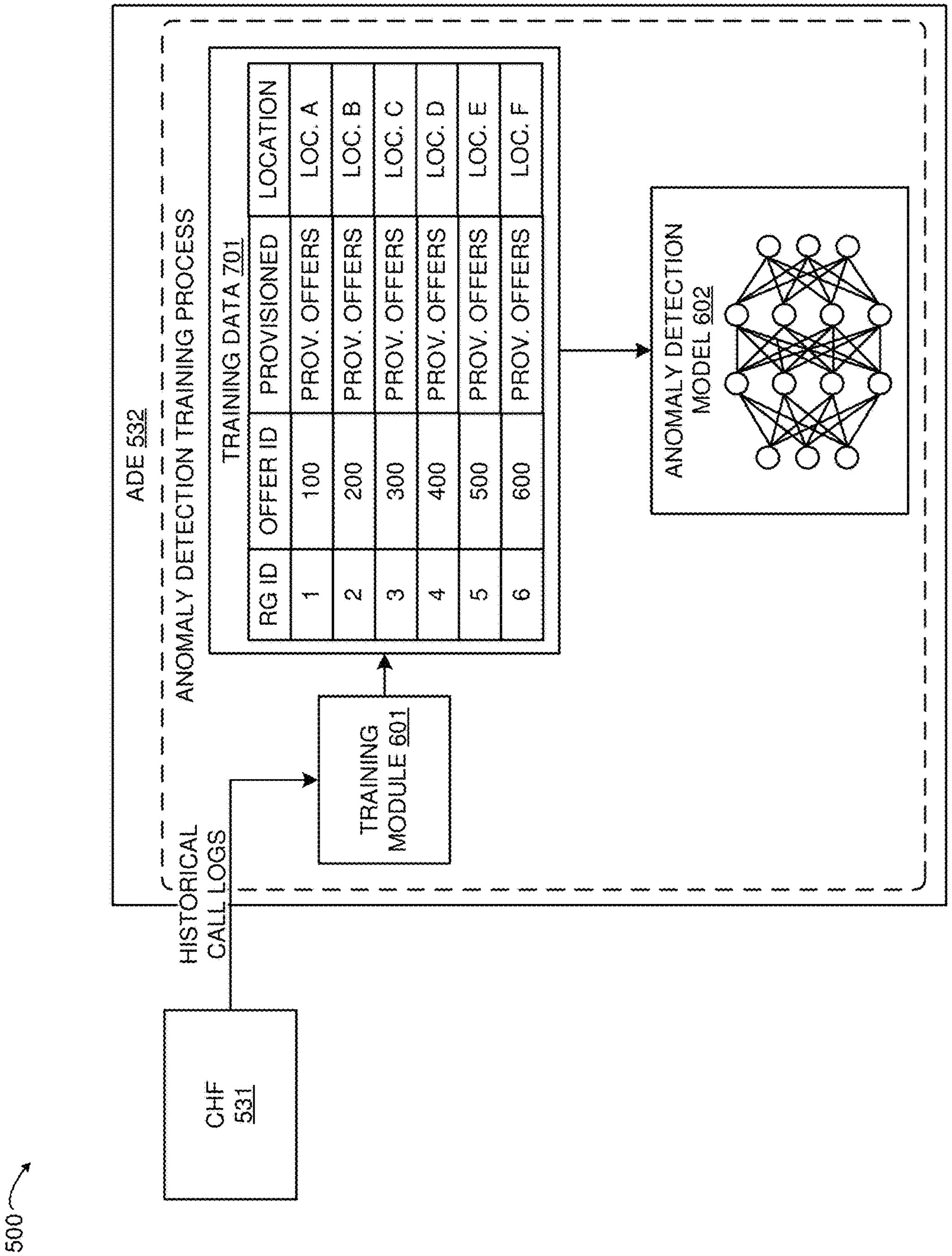
FIG. 7 illustrates an anomaly detection engine in the 5G communication network that utilizes machine learning to determine the cause of rating failures.

FIG. 7 illustrates an exemplary operation of 5G communication network 500 to train anomaly detection model 602. In some examples, training module 601 obtains historical call logs from CHF 531. The historical call logs indicate previous rating failures and the associated rating group, provisioned offers, selected offer, and subscriber location data associated with the rating failures. Training module 601 generates training data 701. As illustrated in FIG. 7, training data 701 associates rating group (RG) IDs, offer IDs, provisioned offers, and locations for each rating failure. The data entries illustrated in FIG. 7 are exemplary and may differ in other examples. While training data 701 is illustrated as having six data rows, model 602 is typically trained using data sets with many more entries (e.g., thousands). Anomaly detection model 702 ingests feature vectors that represent training data 701 and processes the feature vectors to produce a training output The training output predicts the cause and severity of the rating failures based on the feature vectors that represent training data 701. When using unsupervised training, model 602 compares the predicted causes and severity to the actual past causes and severity to assess the accuracy of the prediction. Model 602 then adjusts its algorithm weights based on the accuracy of the prediction to advance the training state of its algorithms. When using supervised training, operators compare the predictions to the actual causes/severity and manually adjust the algorithm weights to advance the training state of model 602. When the training state of model 602 is sufficient (e.g., prediction accuracy exceeds an operator defined threshold), model 602 is pushed to production.

Figure 8:
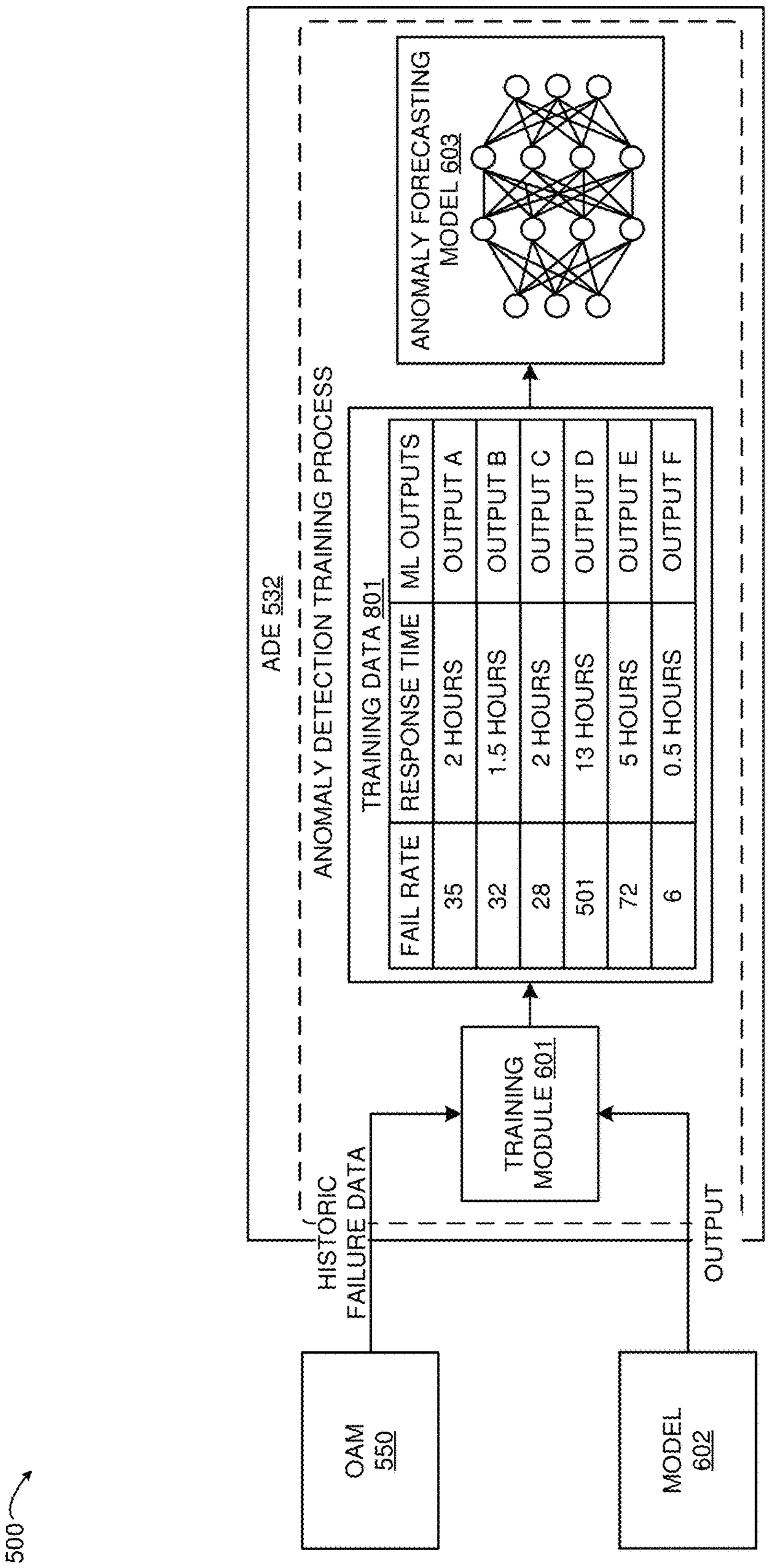
FIG. 8 further illustrates the anomaly detection engine in the 5G communication network that utilizes machine learning to detect illegitimate fail-open conditions.

FIG. 8 illustrates an exemplary operation of 5G communication network 500 to train anomaly forecasting model 603. In some examples, training module 601 obtains historic rating failure data from OAM 550 and machine learning outputs from anomaly detection model 602. The historic rating failure data indicates the failure rate and average response time to correct past rating failures in CHF 531. The outputs from anomaly detection model 602 identify the cause and severity of the past rating failures. Training module 601 generates training data 801. As illustrated in FIG. 8, training data 801 associates CHF 531 failure rates, response times, and model outputs for historic rating failures. These data entries are exemplary and may differ in other examples. While training data 801 is illustrated as having six data rows, model 603 is typically trained using data sets with many more entries. Anomaly forecasting model 603 ingests feature vectors that represent training data 801 and processes the feature vectors to produce a training output The training output predicts an upcoming rating failure rate for CHF 531. When using unsupervised training, model 603 compares the predicted failure rate to the historic failure rate to assess the accuracy of the prediction. Model 603 then adjusts its algorithm weights based on the accuracy of the prediction to advance the training state of its constituent algorithms. When using supervised training, operators compare the failure rate predictions to the actual failure rates and manually adjust the algorithm weights to advance the training state of model 603. When the training state of model 603 is sufficient (e.g., the accuracy of the predictions exceeds an operator defined accuracy threshold), model 603 is pushed to production.

Figure 9:
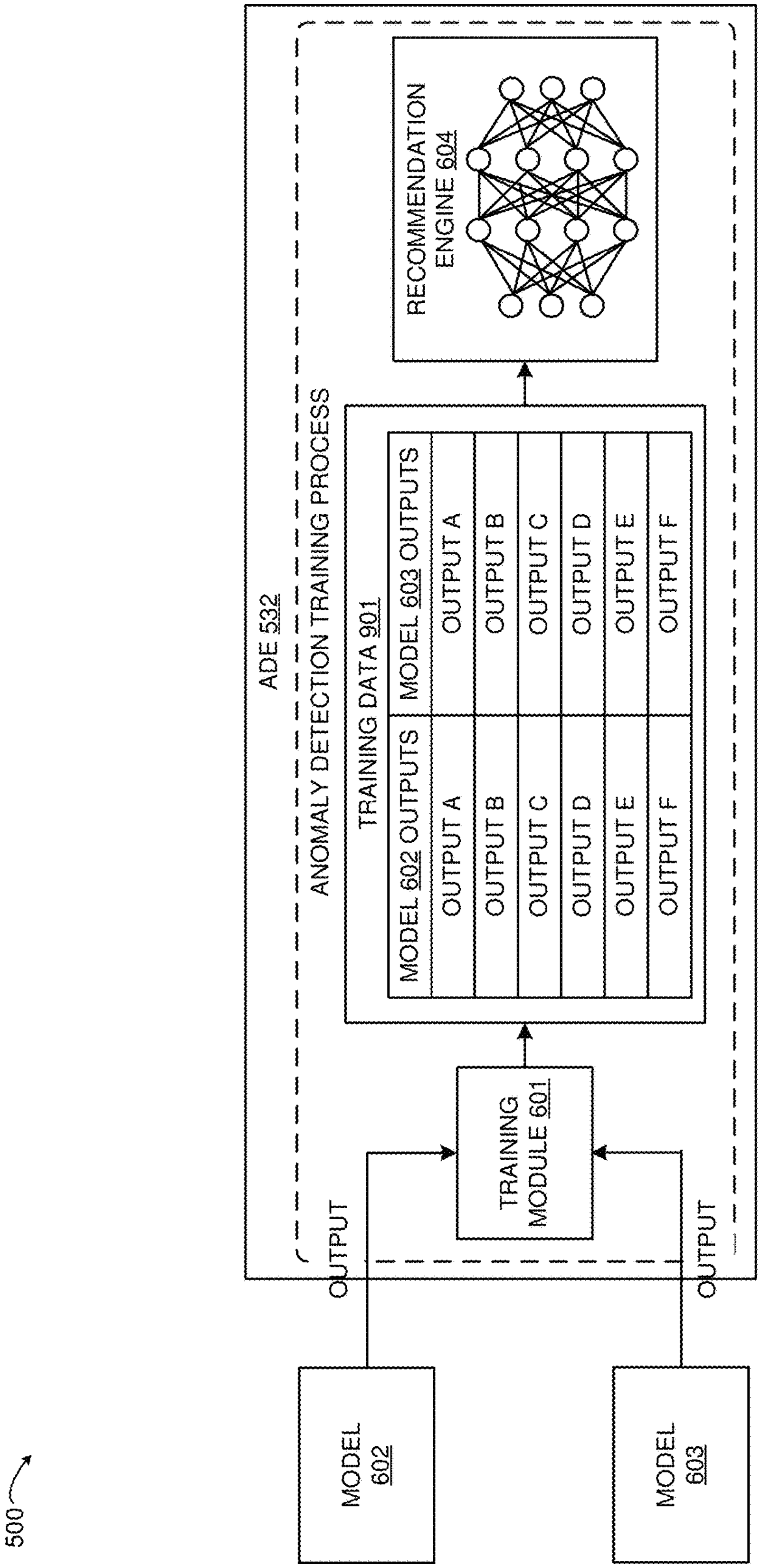
FIG. 9 further illustrates the anomaly detection engine in the 5G communication network that utilizes machine learning to determine the cause of rating failures.

FIG. 9 illustrates an exemplary operation of 5G communication network 500 to train recommendation engine 604. In some examples, training module 601 obtains machine learning outputs from anomaly detection model 602 and anomaly forecasting model 603. The outputs from anomaly detection model 602 identify the cause and severity of historic rating failures. The outputs from anomaly forecasting model 603 predict historic rating failure rates for CHF 531. Training module 601 generates training data 901. As illustrated in FIG. 9, training data 801 associates machine learning outputs from model 602 and machine learning outputs from model 603 for historic rating failures. These data entries are exemplary and may differ in other examples. While training data 901 is illustrated as having six data rows, recommendation engine 604 is typically trained using data sets with many more entries. Recommendation engine 604 ingests feature vectors that represent training data 901 and processes the feature vectors to produce a training output The training output recommends a response for the detected rating failure in CHF 531. When using unsupervised training, recommendation engine 604 compares the recommended response for a historic rating failure to the actual response to the historic rating failure to assess the accuracy of the recommendation. Engine 604 then adjusts its algorithm weights based on the accuracy of the recommendation to advance the training state of its constituent algorithms. When using supervised training, operators compare the recommendations to the actual responses and manually adjust the algorithm weights to advance the training state of engine 604. When the training state of engine 604 is sufficient, engine 604 is pushed to production.

Figure 10:
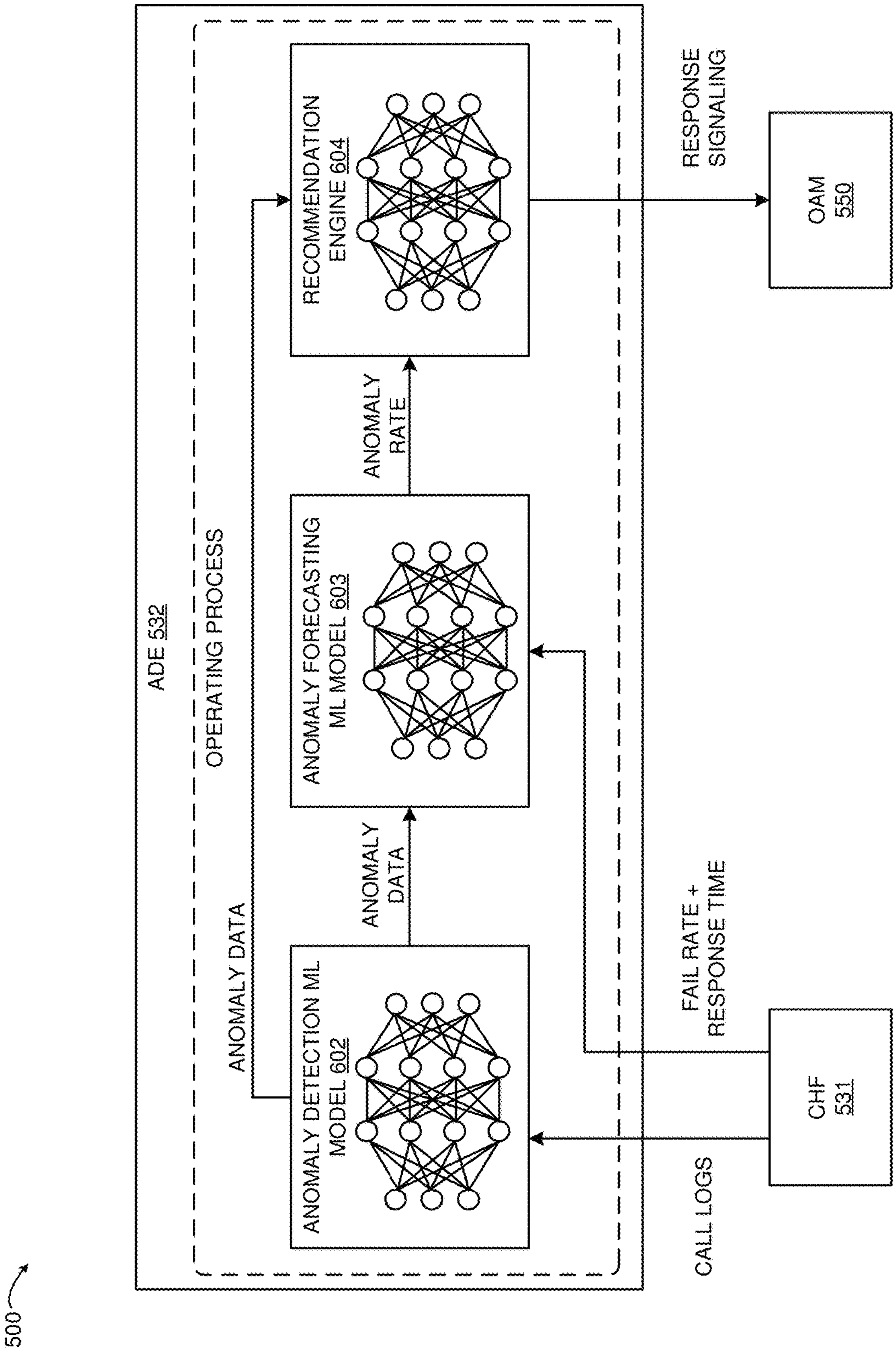
FIG. 10 further illustrates the anomaly detection engine in the 5G communication network that utilizes machine learning to determine the cause of rating failures.

FIG. 10 illustrates an exemplary operation of 5G communication network 500 to determine the cause of rating failures, assess the severity of rating failures, predict the rate of rating failures, and recommend responses to the rating failures and predicted rating failure rates using trained models 602-604. In some examples, CHF 531 (and/or OAM 550) transfers call logs, average rating failure rate, and average response time to ADE 532. The feature extraction module in ADE 532 converts the received data into feature vectors and passes the resulting feature vectors to anomaly detection model 602 and anomaly forecasting model 603. Anomaly detection model 602 ingests the feature vectors and produces an output that predicts the cause and severity of a rating failure on CHF 531. ADE 532 converts the output from model 602 into feature vectors to numerically represent the predictions and passes the resulting feature vectors to anomaly forecasting model 603 and recommendation engine 604. Anomaly forecasting model 603 ingests feature vectors representing the predicted rating failure cause and severity as well as the data received from CHF 531. Model 603 produces an output that predicts the upcoming rate of ratings failures on CHF 531. ADE 532 converts the output from model 603 into feature vectors representing the predicted rating failure rate and passes the resulting feature vectors to recommendation engine 604. Engine 604 ingests the feature vectors representing the predicted cause of the rating failure, the predicted severity of the rating failure, and the predicted rate of rating failure. Engine 604 produces an output that recommends a response to the rating failure on CHF 531 and indicates a response priority based on the severity of the rating failure. Exemplary recommendations include software updates, increased computing resource allocations to CHF 531, and the like. Engine 604 transfers an output that includes the recommended response to OAM 550. OAM 550 takes corrective action to respond to the rating failure based on the recommendation.

Figure 11:
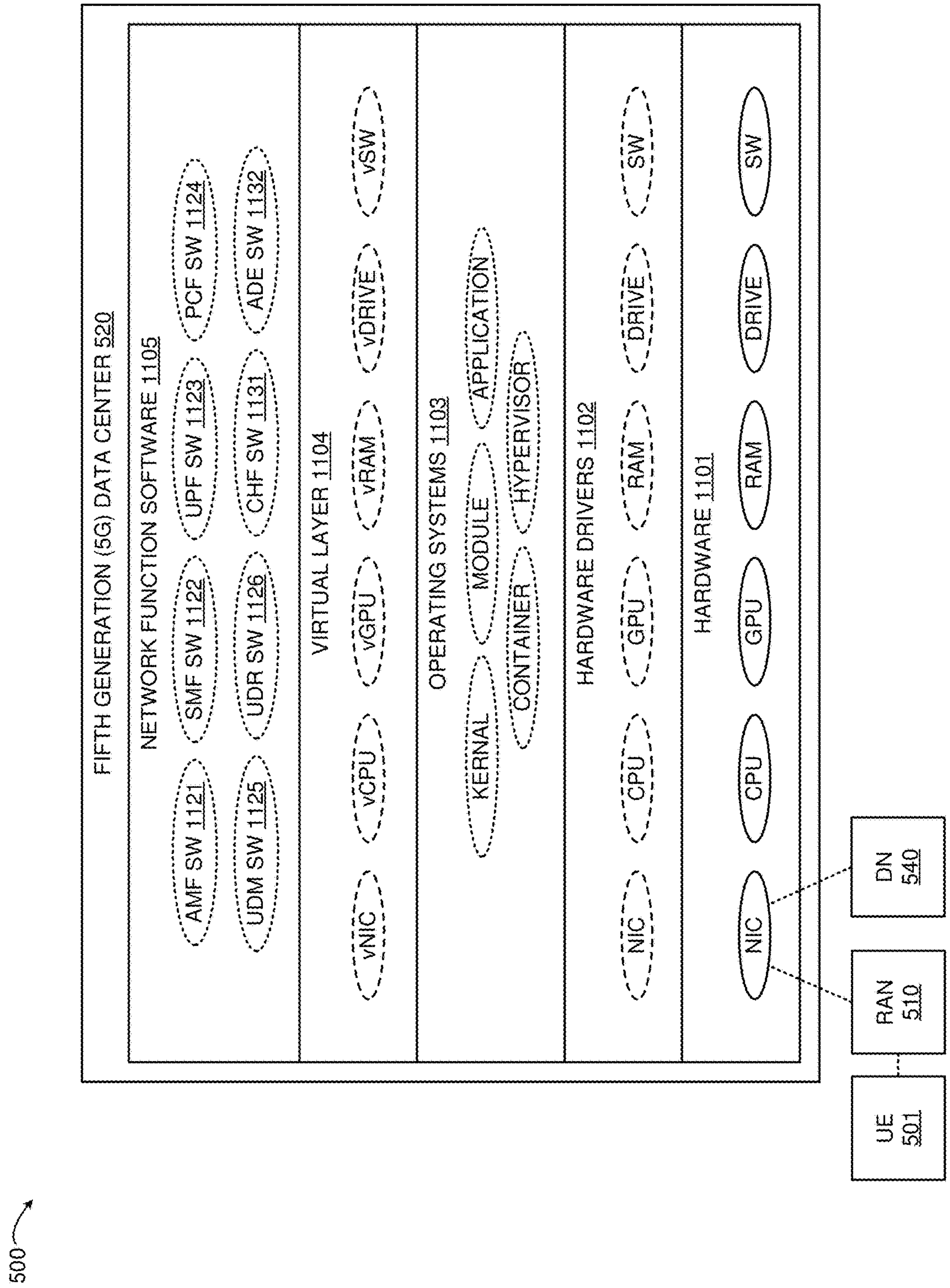
FIG. 11 illustrates a 5G data center in the 5G communication network that utilizes machine learning to determine the cause of rating failures.

FIG. 11 illustrates 5G data center 520 in 5G communication network 500. 5G data center 520 comprises an example of core network 120 illustrated in FIG. 1, although core network 120 may differ. 5G data center 520 typically comprises a virtualized computing architecture like NFVI, but may comprise another computing architecture like a cloud computing network, a hybrid cloud network, and the like. 5G data center 520 comprises hardware 1101, hardware drivers 1102, operating systems 1103, virtual layer 1104, and network function software 1105. Hardware 1101 comprises Network Interface Cards (NICs), CPU, GPU, RAM, Flash/Disk Drives (DRIVE), and Data Switches (SW). Hardware drivers 1102 comprise software that is resident in the NIC, CPU, GPU, RAM, DRIVE, and SW. Operating systems 1103 comprise kernels, modules, applications, containers, hypervisors, and the like. Virtual layer 1104 comprises vNIC, vCPU, vGPU, vRAM, vDRIVE, and vSW. Network function software 1105 comprises AMF Software (SW) 1121, SMF SW 1122, UPF SW 1123, PCF SW 1124, UDM SW 1125, UDR SW 1126, CHF SW 1131, and ADE SW 1132. Additional network function software for network functions like AUSF, NRF, NSSF, HSS, HLR, SMSF, NEF, AF, EIR, and SCP is typically present but is omitted for clarity. 5G data center 520 may be located at a single site or be distributed across multiple geographic locations. The NIC in hardware 1101 is coupled to 5G RAN 510, data network (DN) 540, and to external systems (not illustrated). Hardware 1101 executes hardware drivers 1102, operating systems 1103, virtual layer 1104, and network function software 1105 to form AMF 521, SMF 522, UPF 523, PCF 524, UDM 525, UDR 526, CHF 531, and ADE 532.

Figure 12:
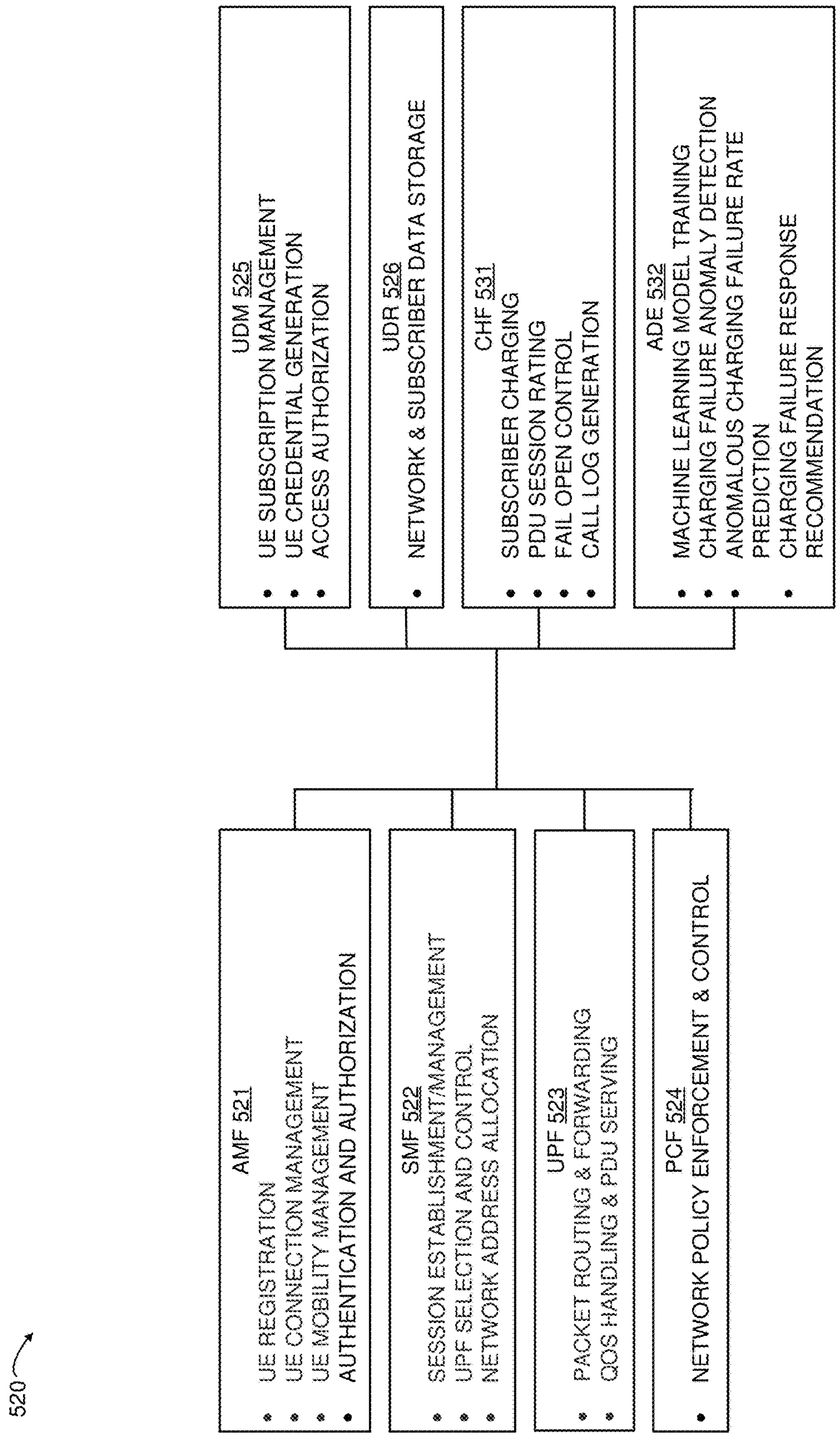
FIG. 12 further illustrates the 5G data center in the 5G communication network that utilizes machine learning to determine the cause of rating failures.

FIG. 12 further illustrates 5G data center 520 in 5G communication network 500. AMF 521 capabilities comprise UE access registration, UE connection management, UE mobility management, UE authentication, and UE authorization. SMF 522 capabilities comprise session establishment, session management, UPF selection, UPF control, and network address allocation. UPF 523 capabilities comprise for packet routing, packet forwarding, QoS handling, and PDU serving. PCF 524 comprises capabilities for network policy enforcement. UDM 525 comprises capabilities for UE subscription management, UE credential generation, and access authorization. UDR 526 comprises capabilities for network data storage and subscriber data storage. CHF 531 comprises capabilities for subscriber charging, PDU session rating, fail open control, and call log generation. ADE 532 capabilities comprise machine learning model training, charging failure anomaly detection, anomalous charging failure rate prediction, and charging failure response recommendation.

Figure 13:
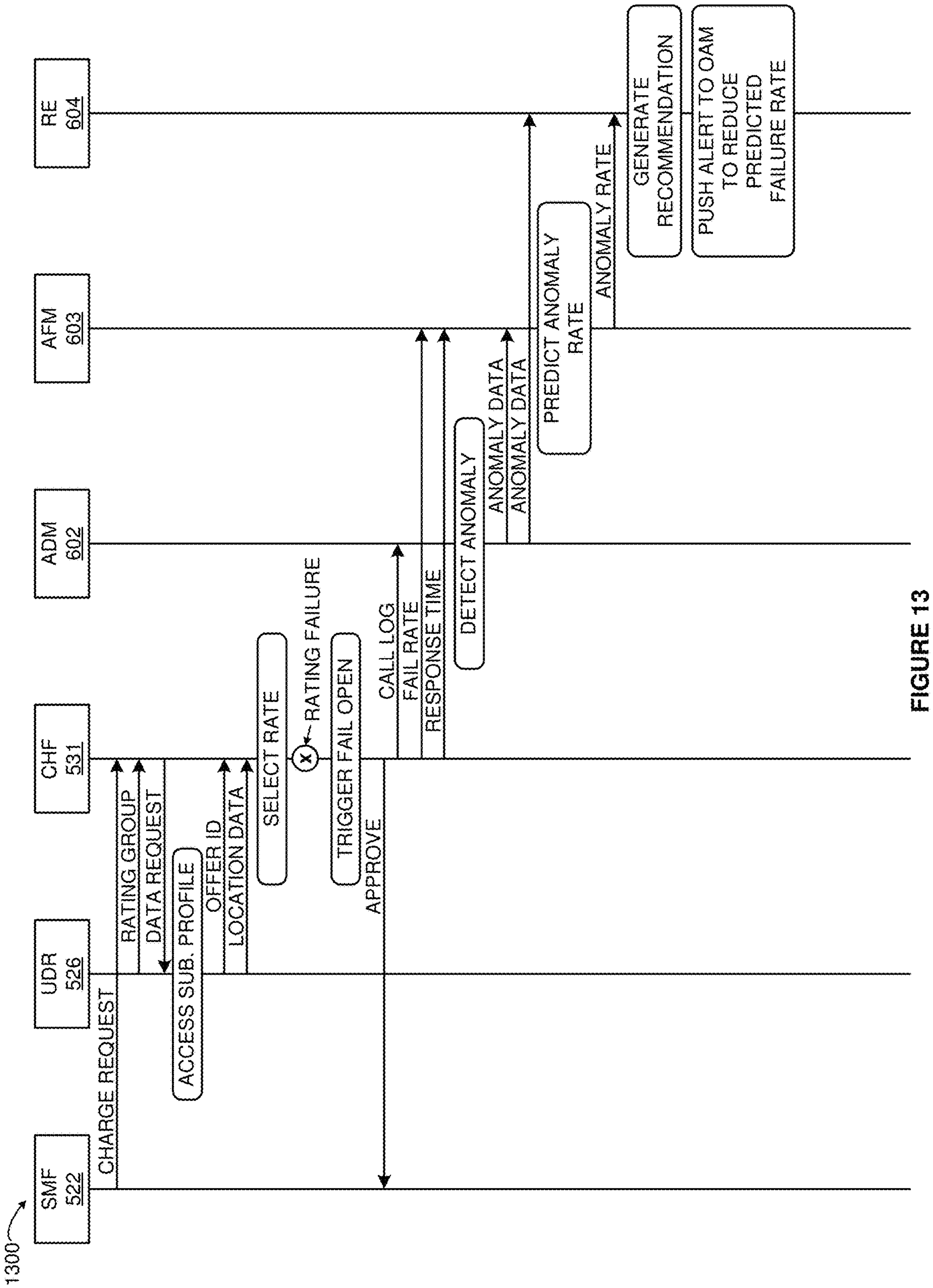
FIG. 13 illustrates an exemplary operation of the 5G communication network to utilize machine learning to determine the cause of rating failures.

FIG. 13 illustrates process 1300. Process 1300 comprises an exemplary operation of 5G communication network 500 to utilize machine learning to determine the cause of rating failures. Process 1300 comprises an example of processes 200, 300, and 400 illustrated in FIGS. 2, 3, and 4, however processes 200, 300, and 400 may differ. Process 1300 may differ in other examples. In some examples, SMF 522 transfers a charging data request to CHF 531 in online charging system 530. The request includes a rating group that characterizes a PDU session for UE 501. CHF 531 receives the charging data request from SMF 522. In response, CHF 531 transfers a data request to UDR 526. UDR 526 accesses UE 501's subscriber profile and indicates the provisioned offer IDs in UE 501's profile as well as subscriber location data for UE 501. CHF 531 selects an offer ID from the provisioned offer IDs based on the rating group. CHF 531 attempts to rate the PDU session based on the rating group, the selected offer, and the UE location information, however, an error occurs inhibiting CHF 531 from rating the PDU session. In this example, the error on CHF 531 comprises excessive CPU loading, however in other examples, the error may differ. In response, CHF 531 decides to fail open the PDU session to minimize service impact towards UE 501 caused by rating failure. CHF 531 selects a default rate for the PDU session based on the rating failure and transfers an approval message to SMF 522.

CHF 531 generates a call log in response to the rating failure for the PDU session. The call log identifies the subscriber (e.g., UE 501), the PDU session, the rating group for the PDU session, the offers provisioned to UE 501's subscriber profile, the offer selected for the PDU session, and location information (e.g., non-roaming, roaming, etc.) for UE 501. CHF 531 transfers the call log as well as the average rating failure rate and the average response time to correct rating failures to ADE 532. ADE 532 generates feature vectors that represent the received data. ADE 532 provides the feature vectors that represent the call logs to anomaly detection model (ADM) 602. Anomaly detection model 602 generates a machine learning output that predicts the cause of the rating failure was due to excessive CPU loading and that the rating failure is severe (e.g., large revenue impact). ADE 532 vectorizes the output from model 602 and provides the vectorized output to anomaly forecasting model (AFM) 603. Anomaly forecasting model 603 processes the vectorized output as well as the vectors representing average failure rate and average response time. Anomaly forecasting model 603 generates an output the predicts the future failure rate for CHF 531. In this example, model 603 predicts an increased failure rate. ADE 532 vectorizes the output from model 603. ADE 532 provides the vectorized outputs from models 602 and 603 to recommendation engine (RE) 604.

Recommendation engine 604 processes the vectorized outputs from models 602 and 603 to generate a recommendation based on the predicted cause of the rating failure (i.e., high CPU loading), the severity of the rating failure (i.e., severe failure), and the predicted future failure rate (i.e., increased rate). In this example, the recommendation comprises increasing the CPU, RAM, and disk memory resources allocated to CHF 531 to correct the rating failure and reduce the predicted rating failure rate. ADE 532 transfers the recommendation generated by recommendation engine 604 as an alert to OAM 550. OAM 550 receives the alert sent by ADE 532. ADE 532 responds to the rating failure on CHF 531 based on the recommendation generated by ADE 532 by allocating additional CPU, RAM, and disk memory resources to CHF 531.

The wireless data network circuitry described above comprises computer hardware and software that form special-purpose network circuitry to utilize machine learning to determine the cause of rating failures. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to utilize machine learning to determine the cause of rating failures.

Although the descriptions provided herein may be in the context of certain radio access technologies, networks, and network topologies, such as 5GNR mobile communications, the proposed concepts, schemes, and any variations thereof may be implemented in, for and by other types of radio access technologies, networks, and network topologies. Such radio access technologies, networks, and network topologies may include, for example and without limitation, LTE, Internet-of-Things (IoT), NB-IoT, Vehicle-to-Everything (V2X), fixed wireless internet, and Non-Terrestrial Network (NTN) communications. Thus, the scope of the disclosure is not limited to the examples described herein.

The above description and associated figures teach the best mode of the invention. For the purpose of teaching inventive principles, some conventional aspects of the best mode may be simplified or omitted. The following claims specify the scope of the invention. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described above, nor the best mode, but only by the claims and their equivalents.

What is claimed is:

1. A method comprising:

obtaining, by a machine learning system in a communication network, a call log from a Charging Function (CHF) in the communication network, wherein the call log indicates a rating failure for a data session associated with a user device and the rating failure indicates the CHF is unable to select a monetary rate to charge the user device for the data session;

generating, by the machine learning system, a feature vector that numerically represents the call log;

utilizing, by the machine learning system, a machine learning algorithm trained to determine causes of rating failures by the CHF to process the feature vector and generate a machine learning output that indicates a cause of the rating failure for the data session associated with the user device;

generating, by the machine learning system, an alert that identifies the cause of the rating failure based on the machine learning output; and transferring, by the machine learning system, the alert to a controller in the communication network wherein the controller interfaces with the CHF to correct the cause of the rating failure for the data session associated with the user device.

2. The method of claim 1 further comprising:
generating, by the machine learning system, a second feature vector that numerically represents the machine learning output; and
utilizing, by the machine learning system, a second machine learning algorithm trained to forecast rating failure rates for the CHF to process the second feature vector and generate a second machine learning output that predicts a rating failure rate for the CHF; and wherein:
generating, by the machine learning system, the alert comprises generating, by the machine learning system, the alert that identifies the cause of the rating failure and the predicted rating failure rate based on the machine learning output and the second machine learning output; and
the controller interfaces with the CHF to correct the cause of the rating failure and to reduce the predicted rating failure rate based on the alert.

3. The method of claim 2 further comprising:
generating, by the machine learning system, a third feature vector that numerically represents the second machine learning output;
utilizing, by the machine learning system, a third machine learning algorithm trained to recommend responses to correct the causes of rating failures and reduce the predicted rating failure rates on the CHF to process the second feature vector and the third feature vector and generate an third machine learning output that recommends a corrective action to correct the cause of the rating failure and reduce the predicted rating failure rate; and wherein:
generating, by the machine learning system, the alert comprises generating, by the machine learning system, the alert that identifies the cause of the rating failure, identifies the predicted rating failure rate, and includes the recommended corrective action to correct the cause of the rating failure and reduce the predicted rating failure rate; and
the controller interfaces with the CHF to correct the cause of the rating failure for the data session associated with the user device and reduce the predicted rating failure rate based on the recommended corrective action.

4. The method of claim 1 wherein:
the call log indicates a data type and a session type for the data session associated with the user device; and
the feature vector numerically represents the data type and session type for the data session associated with the user device.

5. The method of claim 1 wherein:
the call log indicates provisioned service types associated with the user device; and
the feature vector numerically represents the provisioned service types associated with the user device.

6. The method of claim 1 wherein:
the call log indicates a service type selected by the CHF to rate the data session associated with the user device; and
the feature vector numerically represents the service type selected by the CHF to rate the data session associated with the user device.

7. The method of claim 1 wherein:
the call log indicates location information associated with the user device; and
the feature vector numerically represents the location information associated with the user device.

8. A system comprising:
machine learning circuitry in a communication network configured to:
obtain a call log from a Charging Function (CHF) in the communication network, wherein the call log indicates a rating failure for a data session associated with a user device and the rating failure indicates the CHF is unable to select a monetary rate to charge the user device for the data session;
generate a feature vector that numerically represents the call log;
utilize a machine learning algorithm trained to determine causes of rating failures by the CHF to process the feature vector and generate a machine learning output that indicates the cause of the rating failure for the data session associated with the user device;
generate an alert that identifies the cause of the rating failure based on the machine learning output; and
transfer the alert to a controller in the communication network wherein the controller interfaces with the CHF to correct the cause of the rating failure for the data session associated with the user device based on the alert.

9. The system of claim 8 wherein the machine learning circuitry is further configured to:
generate a second feature vector that numerically represents the machine learning output; and
utilize a second machine learning algorithm trained to forecast rating failure rates for the CHF to process the second feature vector and generate a second machine learning output that predicts a rating failure rate for the CHF; and
generate the alert that identifies the cause of the rating failure and the predicted rating failure rate for the CHF based on the machine learning output and the second machine learning output; and wherein:
the controller interfaces with the CHF to correct the cause of the rating failure and to reduce the predicted rating failure rate based on the alert.

10. The system of claim 9 wherein the machine learning circuitry is further configured to:
generate a third feature vector that numerically represents the second machine learning output;
utilize a third machine learning algorithm trained to recommend responses to correct the causes of rating failures and reduce the predicted rating failure rates on the CHF to process the second feature vector and the third feature vector and generate a third machine learning output that recommends a corrective action to correct the cause of the rating failure and reduce the predicted rating failure rate; and
generate the alert that identifies the cause of the rating failure, identifies the predicted rating failure rate, and includes the recommended corrective action to correct the cause of the rating failure and reduce the predicted rating failure rate; and wherein:
the controller interfaces with the CHF to correct the cause of the rating failure and reduce the predicted rating failure rate based on the recommended corrective action.

11. The system of claim 8 wherein:
the call log indicates a data type and a session type for the data session associated with the user device; and
the feature vector numerically represents the data type and session type for the data session associated with the user device.

12. The system of claim 8 wherein:

the call log indicates provisioned service types associated with the user device; and the feature vector numerically represents the provisioned service types associated with the user device.

13. The system of claim 8 wherein:

the call log indicates a service type selected by the CHF to rate the data session associated with the user device; and the feature vector numerically represents the service type selected by the CHF to rate the data session associated with the user device.

14. The system of claim 8 wherein:

the call log indicates location information associated with the user device; and the feature vector numerically represents the location information associated with the user device.

15. One or more non-transitory computer readable storage media having program instructions stored thereon, wherein the program instruction, when executed by a computing system, direct the computing system to perform operations, the operations comprising:

obtaining a call log from a Charging Function (CHF) in a communication network, wherein the call log indicates a rating failure for a data session associated with a user device and the rating failure indicates the CHF is unable to select a monetary rate to charge the user device for the data session;

generating a feature vector that numerically represents the call log;

utilizing a machine learning algorithm trained to determine causes of rating failures by the CHF to process the feature vector and generate a machine learning output that indicates the cause of the rating failure for the data session associated with the user device;

generating an alert that identifies the cause of the rating failure based on the machine learning output; and transferring the alert to a controller in the communication network.

16. The computer readable storage media of claim 15 wherein the operations further comprise:

generating a second feature vector that numerically represents the machine learning output; and utilizing a second machine learning algorithm trained to forecast rating failure rates for the CHF to process the second feature vector and generate a second machine learning output that predicts a rating failure rate for the CHF; and wherein:

generating the alert comprises generating the alert that identifies the cause of the rating failure and that identifies the predicted rating failure rate for the CHF; and the controller interfaces with the CHF to correct the cause of the rating failure and to reduce the predicted rating failure rate based on the alert.

17. The computer readable storage media of claim 16 wherein the operations further comprise:

generating a third feature vector that numerically represents the second machine learning output;

utilizing a third machine learning algorithm trained to recommend responses to correct the causes of rating failures and reduce the predicted rating failure rates on the CHF to process the second feature vector and the third feature vector and generate a third machine learning output that recommends a corrective action to correct the cause of the rating failure and reduce the predicted rating failure rate; and wherein:

generating the alert comprises generating the alert that identifies the cause of the rating failure, identifies the predicted rating failure rate for the CHF, and includes the recommended corrective action to correct the cause of the rating failure and reduce the predicted rating failure rate; and the controller interfaces with the CHF to correct the cause of the rating failure for the data session associated with the user device and reduce the predicted rating failure rate based on the recommended corrective action.

18. The computer readable storage media of claim 15 wherein:

the call log indicates a data type and a session type for the data session associated with the user device; and the feature vector numerically represents the data type and session type for the data session associated with the user device.

19. The computer readable storage media of claim 15 wherein:

the call log indicates provisioned service types associated with the user device and a service type selected by the CHF to rate the data session associated with the user device; and the feature vector numerically represents the provisioned service types associated with the user device and the service type selected by the CHF to rate the data session associated with the user device.

20. The computer readable storage media of claim 15 wherein:

the call log indicates location information associated with the user device; and the feature vector numerically represents the location information associated with the user device.

* * * * *